Aug. 3, 1926.

P. A. WOFFORD 1,594,584

RECORDING SPEEDOMETER

Original Filed Sept. 8, 1923   4 Sheets-Sheet 1

Porter A. Wofford
INVENTOR

BY Victor J. Evans
ATTORNEY

WITNESS:

Aug. 3, 1926.
P. A. WOFFORD
1,594,584
RECORDING SPEEDOMETER
Original Filed Sept. 8, 1923   4 Sheets-Sheet 2
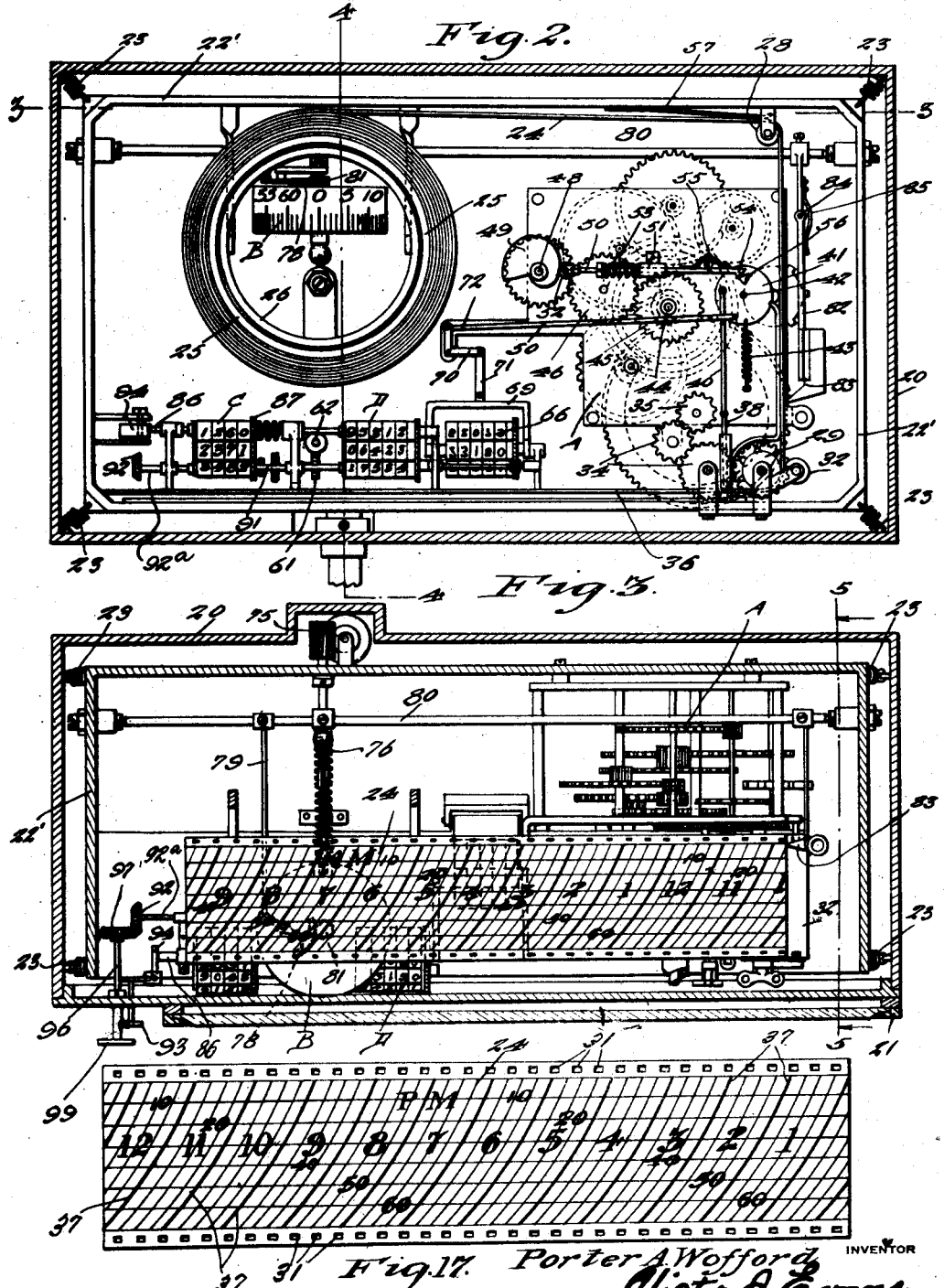

Aug. 3, 1926.
P. A. WOFFORD
1,594,584
RECORDING SPEEDOMETER
Original Filed Sept. 8, 1923    4 Sheets-Sheet 3
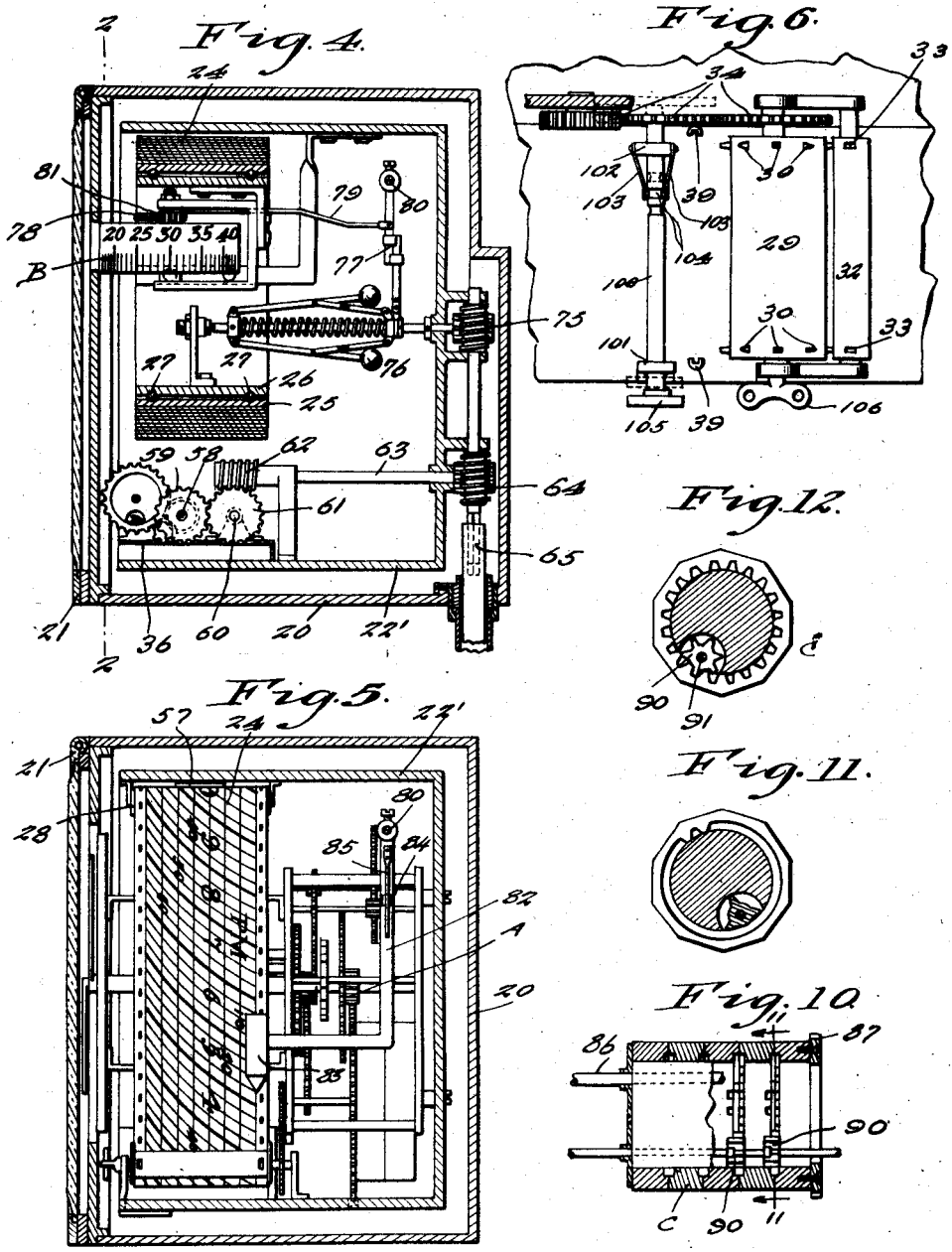
Porter A. Wofford  INVENTOR
BY *Victor J. Evans*
ATTORNEY Aug. 3, 1926.
P. A. WOFFORD
1,594,584
RECORDING SPEEDOMETER
Original Filed Sept. 8, 1923  4 Sheets-Sheet 4
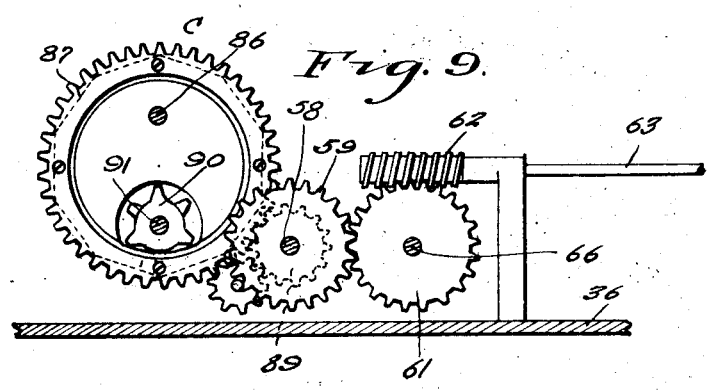
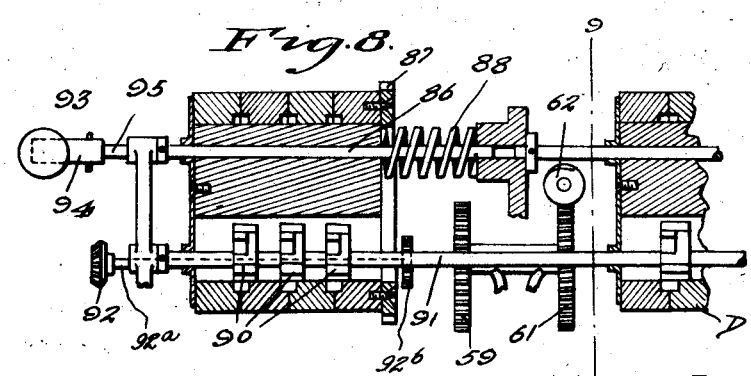
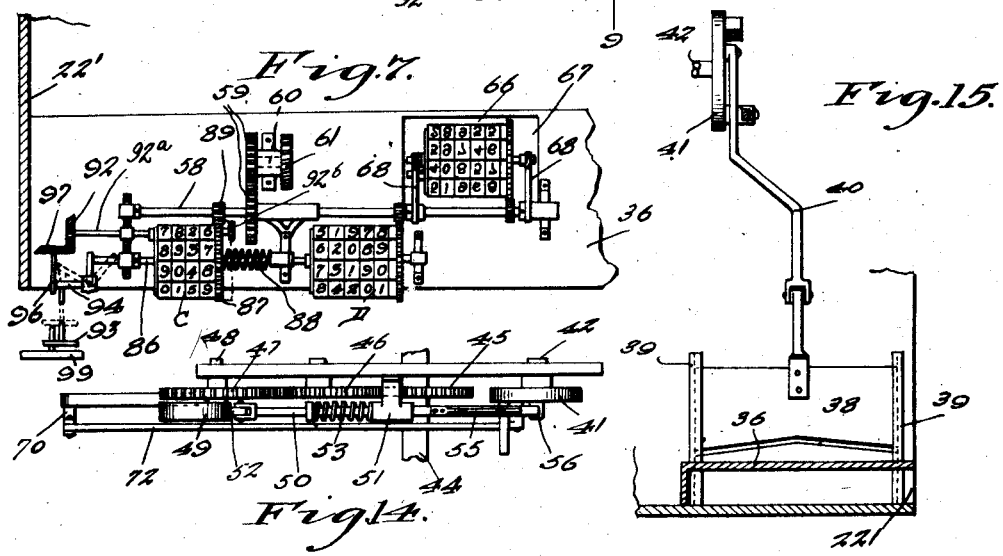
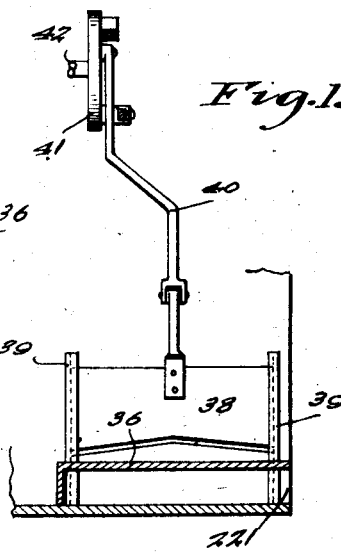
Porter A. Wofford INVENTOR Patented Aug. 3, 1926.

1,594,584

UNITED STATES PATENT OFFICE.

PORTER A. WOFFORD, OF SHREVEPORT, LOUISIANA, ASSIGNOR OF FORTY-NINE ONE-HUNDREDTHS TO WILLIAM A. LEVERETT, OF SHREVEPORT, LOUISIANA.

RECORDING SPEEDOMETER.

Application filed September 8, 1923, Serial No. 661,644. Renewed August 14, 1925.

This invention relates to recording devices and has for an object the provision of a recording speedometer, which may be attached to and operated by a motor or railway vehicle for the purpose of making a record of the time at which the vehicle was used and the speed at which it was operated.

Another object of the invention is the provision of a recording mechanism by means of which the owner or other authorized person may determine when a vehicle was used and the speed and time at which it was operated, the invention being especially useful in keeping a record of the movements of vehicles operated by paid drivers or chauffeurs.

With the above and other objects in view, the invention further includes the following novel features and details of construction, to be hereinafter more fully described, illustrated in the accompanying drawings and pointed out in the appended claims.

In the drawings:—

Figure 2 is a sectional view on the line 2—2 of Figure 4.

Figure 3 is a section taken substantially on the line 3—3 of Figure 2.

Figure 4 is a section taken substantially on the line 4—4 of Figure 2.

Figure 5 is a section on the line 5—5 of Figure 3.

Figure 6 is a fragmentary plan view of the tape operating mechanism.

Figure 7 is a fragmentary plan view of the indicating and printing mechanisms.

Figure 8 is an enlarged sectional view through the trip indicator.

Figure 9 is a section taken substantially on the line 9—9 of Figure 8.

Figure 10 is a sectional view through the season mileage indicator.

Figure 11 is a section on the line 11—11 of Figure 10 looking in the direction of the arrow.

Figure 12 is a similar view looking in an opposite direction.

Figure 13 is an enlarged end elevation of a portion of the printing mechanism illustrating by dotted lines the printing position of the roller and the indicator pad.

Figure 14 is a fragmentary plan view showing the means of operating the printing mechanism and the cutting mechanism.

Fig. 17 is a detail view of the record strip.

Figure 1:
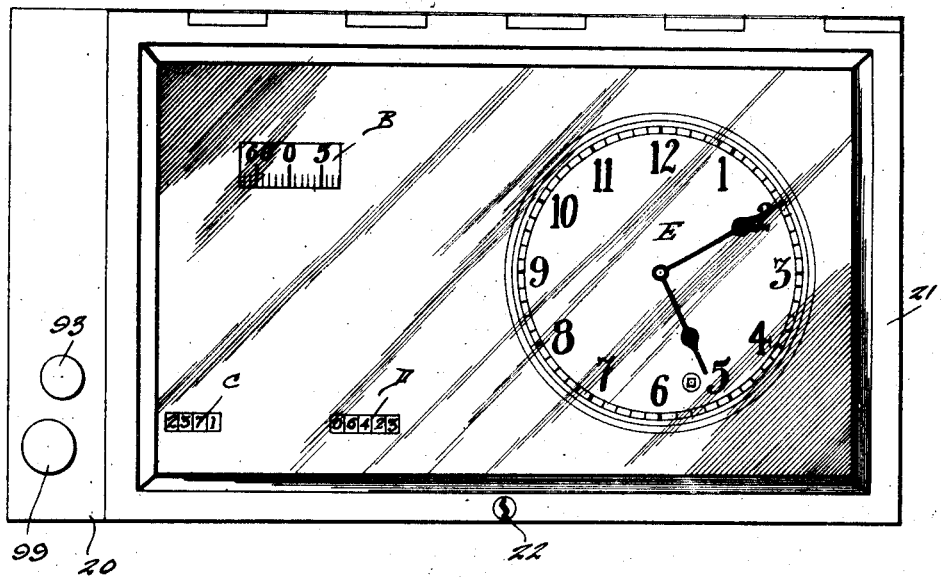
Figure 1 is a face view of a recording speedometer constructed in accordance with the invention.
Figure 15:
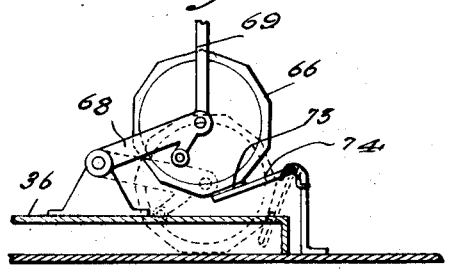
Figure 15 is an enlarged fragmentary view showing the cutting knife and its operating means.
Figure 16:
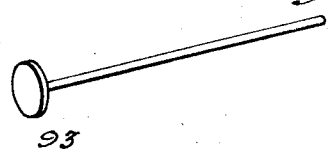
Figure 16 is a detail perspective view of the shifting button for resetting the indicator dials.

Referring to the drawings in detail wherein like characters of reference denote corresponding parts, the recording speedometer which constitutes the present invention is shown as comprising a casing 20 within which the mechanism is contained, the said casing being provided with a door 21 which is hinged to the casing and which is provided with a suitable lock indicated at 22 so that access may be had to the mechanism only by properly authorized persons.

The invention includes a clock mechanism which is located within the casing 20 and which is indicated generally at A, a speed indicating dial B, trip mileage indicating dials C and season or total mileage indicating dials D. The dials B, C and D are visible through openings provided in the door 21, while the clock mechanism A is provided with a face or dial E, which is likewise visible through an opening in the door 21.

All of the operating mechanism which is contained within the casing 20 is mounted upon a floating frame 22' which is connected to the casing 20 by means of springs 23 so that the shocks and jars incident to travel will not be transferred to the mechanism.

The invention further includes a printing mechanism which is housed within the casing 20 and the strip or tape 24 upon which a record is made of the number of miles traveled, speed per hour and the time at which the record was made. For this purpose there is provided a cylinder 25 from which the tape or strip 24 is unwound. As shown in Figure 4 this cylinder 25 is rotatably mounted on a stationary cylinder 26 and operates on anti-friction bearings 27. The strip 24 passes around a guide roller 28 which is carried by the frame 22' and around a feed roller 29 which is provided at its opposite ends with teeth or projections 30, as clearly shown in Figure 6 of the drawings. These teeth or projections are adapted to enter spaced openings 31 provided along the marginal edges of the strip and the latter is held in proper position for engagement by the teeth by means of a roller 32. This last mentioned roller is provided adjacent each end with depressions 33 which receive the teeth 30 after the latter passes through the openings 31 of the tape. The roller 29 is driven by means of a train of gears 34 which receive motion from the clock mechanism A, a driving gear being mounted upon the shaft 35 of the clock mechanism. The tape passes from the roller 29 beneath a platform or partition 36, which is carried by the frame 22.

This tape is divided into sections, each section representing twelve hours of the day and each alternate section indicating a. m. and p. m. The sections are divided into hours from one to twelve by means of the heavy lines 37, the space between these lines representing an hour while each hour is divided into fractions thereof by lighter lines. The lines 37 are intersected by longitudinally arranged lines which divide the strip into miles, each division representing a unit of ten miles. Of course further divisions may be made so as to provide units of five miles or less.

The length of the platform or partition 36 is such as to accommodate beneath it one section of a tape representing twelve hours and when this amount of tape or strip has been used it is cut off and remains in the space provided below the partition until the door 21 is unlocked to permit of its removal.

In order to cut the tape or strip there is provided a knife 38 which operates in guides 39 carried by the frame 20. This knife 38 is connected by means of a pitman 40 with a wheel or disk 41 to which the pitman is eccentrically connected. The wheel or disk 41 is mounted upon a stub shaft 42 and is yieldingly held against rotation by means of a spring 43.

Mounted upon the hour arbor 44 of the clock mechanism A is a gear 45 which engages an idler gear 46, while the latter in turn engages and operates a gear 47 which is mounted upon a shaft 48. Also mounted upon this shaft is a cam 49 which operates a longitudinally movable rod 50. The rod 50 operates in a suitable guide 51 and carries at one end a roller 52 which bears against the cam 59, being yieldingly forced into contact with the cam by means of a spring 53. The opposite end of the rod 50 has pivotally connected thereto by means of a rail joint, a hook 54 and the latter is normally held against upward movement by means of a spring 55. The hook is adapted to engage a stud 56 which is carried by the disk 41.

As the cam 49 is operated under the influence of the clock mechanism, the rod 50 will be forced to the right of Figure 2 of the drawings and against the action of the spring 53. The hook 54 will ride over the stud 56 and when the outer extremity of the cam is reached, the spring 53 which is stronger than the spring 43, will rotate the disk 41 through the engagement of the hook 54 and stud 56 and force the knife 38 downward to cut the strip 24. The mechanism is so timed that this cutting action occurs once every twelve hours. In order to properly tension the strip there is provided a spring arm 57 which bears against or upon the strip where it passes over the guide roller 28, as shown in Figure 2.

The trip mileage indicating dials C may be of any number. Four of these dials are shown and indicate reading from right to left, tenths of a mile, units, tens and hundreds, motion being transferred from one dial to the other in any preferred manner. One means for accomplishing this transfer of motion is illustrated in Figures 10, 11 and 12.

The season or total mileage indicating dials are shown as including units, tens, hundreds, thousands and ten thousands, the unit dial of the season mileage indicator being movable simultaneously with the unit dial of the trip mileage indicator through the gearing shown in Figures 4 and 7 and including a shaft 58. This shaft is driven by gears 59, one of which is mounted upon a stub shaft 60 and the latter has also mounted thereon a worm gear 61. The gear 61 is driven by a worm 62 which is mounted upon one end of a shaft 63 and this last mentioned shaft is driven by a worm gearing 64 which is operated by the operation of the vehicle to which the device is attached, preferably through a sliding connection 65 so as to allow for movement of the floating frame 22.

The printing mechanism includes a plurality of dials 66 which are of the same number and character as the dials of the season mileage indicator and are movable simultaneously therewith or in such manner that the number of miles readable through the opening in the door 21 will be positioned for contact with the strip 24. In Figure 1 of the drawings this number is indicated as 6,423 and this number will be so positioned upon the printing dials 66 that when the latter is operated it will be imprinted upon the strip 24.

The dials 66 of the printing mechanism are movable vertically as a unit and pass through an opening 67 provided in the partition or platform 36. As shown in Figure 13 of the drawings, the dials 66 are mounted upon pivotally mounted arms 68 and have connected thereto a yoke 69. The latter is connected to a bell crank lever 70 by means of a link 71. The bell crank lever 70 is eccentrically connected to the disk 41 by means of a rod 72, so that when the disk is rotated in the manner previously described through the action of the cam 49, the printing dials will be depressed into engagement with the strip 24.

The numbers arranged upon the dials 66 for the next printing operation are inked by means of a pad 73 which engages or contacts with these numbers when the dials are in elevated position, as shown in Figure 13 of the drawings. The pad 73 is carried by a pivotally mounted spring actuated arm 74 and when the dials 66 are depressed to the printing position as shown by the dotted lines in Figure 13, the pad 73 will be moved out of the way.

As thus far described it will be apparent that as the mileage dials are operated the printing dials will be simultaneously operated so that the total number of miles will be added on the printing dials and this total printed upon the strip 24 once every twelve hours.

The speed indicating dial B is operated through a worm drive 75 which is also driven through the connection 65 shown in Figure 4 of the drawings. The worm drive 75 operates a governor 76 and the latter through the connections 77 operates a rack 78 which is carried at the outer end of a rod 79, the connections 77 being mounted upon a pivot shaft 80. The rack 78 operates a pinion 81 which is secured to the dial B so that the latter will be rotated through the longitudinal movement of the rod 79. Secured upon the pivot shaft 80 as shown in Figure 2 of the drawings is an arm 82 which carries at one end a scriber. This scriber may be in the form of a fountain pen 83 and as the arm 82 is of sectional formation with its sections pivotally connected together as shown at 84, the pen or scriber 83 will be yieldingly forced into contact with the strip 24 by means of a spring 85.

As the pivot shaft 80 is rocked through the operation of the speed indicating mechanism, the arm 82 will be moved transversely of the strip 24 across the longitudinal division lines of the said strip so as to indicate thereon the speed at which the vehicle is traveling, while the hour divisions will indicate the time at which the vehicle is driven.

In order to reset the trip indicating dials to zero, they are mounted upon a shaft 86 so as to be slidable laterally as a unit, the unit including a gear 87 which acts as a driving gear for the dials. The dial unit is yieldingly held against sliding movement by means of a spring 88 and the gear 87 engages a driving pinion 89 which is mounted upon the shaft 58. The transfer wheels 90 for the trip indicating dials are mounted upon a shaft 91. Mounted upon a shaft 92$^a$ is a beveled gear 92 which carries at its opposite end a pinion 92$^b$, the latter being spaced laterally from the gear 87. Extending through the front of the casing 20 is a shifting button 93 whose shank engages a bell crank lever 94, while the latter is adapted to engage one end of the shaft 86. As the transfer wheels 90 engage the dials, by pushing inward upon the button 93, the shaft 86, dials and transfer wheels will be moved laterally a sufficient distance to engage the gear 87 with the pinion 92$^b$ of the shaft 92$^a$ and disengage the gear 87 from the driving pinion 89.

Extending through the casing is a shaft 96 which carries at its inner end a beveled pinion 97, the latter engaging the pinion 92. This shaft has secured upon its outer end a button 99 by means of which it may be rotated. Thus, when the trip indicating dials are moved laterally by pressing the button 93, the shaft 92$^a$, through the operation of the button 99, may be rotated to operate the dials in a reverse direction due to the engagement of the gear 89 and the pinion 92$^b$ so as to reset the trip indicating dials to zero.

One of the gears of the gear train 34 is carried by a shaft 100, the said shaft being rotatably and longitudinally movable in bearings 101 and 102. The last mentioned bearing carries spring arms 103 whose outer ends are adapted for engagement within spaced annular grooves or seats 104 provided in the shaft 100.

As shown in Figure 6 of the drawings it will be seen that when the gear shaft 100 is in the full line position, motion will be imparted to the feed roller 29, the spring arms 103 engaging one of the annular grooves or seats 104, so as to hold the gear in proper position. By pressing the button 105 inwardly, the shaft 100 will be moved longitudinally until its gear assumes the dotted line position shown in Figure 6 so that it will be disengaged from the train. The feed roller 29 may then be independently rotated through the medium of a finger piece 106. This permits of the insertion of a new tape, or of the adjustment of the tape already inserted. For example, assuming that the clock mechanism which drives the tape should stop, the tape will of course likewise cease to move, so that when the clock mechanism should be subsequently set, the tape will start from the same position it assumed when it ceased operation, so that the said tape would not register with the clock. By disconnecting the drive roller 29 in the manner previously stated, the tape may be set up so as to move properly with the operation of the time mechanism.

The invention is susceptible of various changes in its form, proportions and minor details of construction and the right is herein reserve to make such changes as properly fall within the scope of the appended claims.

Having described the invention what is claimed is:—

1. A recording speedometer comprising a movable tape, a time mechanism, means for moving the tape, mileage indicating mechanism, a printing mechanism, means operated by the mileage mechanism for automatically setting the printing mechanism and means controlled by the time mechanism for moving the printing mechanism into printing contact with the tape at regular intervals, a cutting mechanism and means controlled by the time mechanism for operating the cutting mechanism to cut the tape.

2. A recording speedometer comprising a movable tape, a time mechanism, means for moving the tape, mileage indicating mechanism, a printing mechanism, means operated by the mileage mechanism for automatically setting the printing mechanism and means controlled by the time mechanism for moving the printing mechanism into printing contact with the tape at regular intervals, a knife for cutting the tape, a spring resisted rotatably mounted disk, means operatively connecting the knife and disk, whereby operation of the latter will operate the knife and means controlled by the time mechanism for operating the disk at predetermined intervals.

3. A recording speedometer comprising a movable tape, a time mechanism, means for moving the tape, mileage indicating mechanism, a printing mechanism, means operated by the mileage mechanism for automatically setting the printing mechanism and means controlled by the time mechanism for moving the printing mechanism into printing contact with the tape at regular intervals, a knife for cutting the tape, a spring resisted rotatably mounted disk, means operatively connecting the knife and disk, whereby operation of the latter will operate the knife, a cam operated by the time mechanism and means operated by the cam and engageable with the disk for operating the latter at predetermined intervals.

4. A recording speedometer comprising a movable tape, a time mechanism, means for moving the tape, mileage indicating mechanism, a printing mechanism, means operated by the mileage mechanism for automatically setting the printing mechanism and means controlled by the time mechanism for moving the printing mechanism into printing contact with the tape at regular intervals, a knife for cutting the tape, a spring resisted rotatably mounted disk, means operatively connecting the knife and disk, whereby operation of the latter will operate the knife, a cam operated by the time mechanism and means including a spring actuated pivotally mounted hook operated by the cam and engageable with the disk for operating the latter at predetermined intervals.

5. A recording speedometer comprising a movable tape, a time mechanism, means for moving the tape, mileage indicating mechanism, a printing mechanism, means operated by the mileage mechanism for automatically setting the printing mechanism and means controlled by the time mechanism for moving the printing mechanism into printing contact with the tape at regular intervals, a knife for cutting the tape, a spring resisted rotatably mounted disk, means operatively connecting the knife and disk, whereby operation of the latter will operate the knife, a cam operated by the time mechanism, a spring actuated rod controlled by the cam and a hook pivotally mounted upon the rod and engageable with the disk for operating the latter at predetermined intervals.

6. A recording speedometer comprising a movable tape, a time mechanism, means for moving the tape, mileage indicating mechanism, a printing mechanism, means operated by the mileage mechanism for automatically setting the printing mechanism, means controlled by the time mechanism for moving the printing mechanism into printing contact with the tape at regular intervals and means including a longitudinally movable shaft included in the tape moving means, whereby said tape moving means may be disengaged from the time mechanism to permit the tape to be moved independently of said time mechanism and yieldable means for holding the shaft against accidental movement.

7. A recording speedometer comprising a movable tape, a time mechanism, means for moving the tape, a mileage indicating mechanism, a printing mechanism, means operated by the mileage mechanism for automatically setting the printing mechanism, means controlled by the time mechanism for moving the printing mechanism into printing contact with the tape at regular intervals, a cutting mechanism and means including an intermittently operated rock shaft and means for yieldingly resisting movement of said shaft for operating the cutting mechanism at predetermined intervals.

In testimony whereof I affix my signature.

PORTER A. WOFFORD.